United States Patent [19]  [11] 3,977,768
Nakamura et al.  [45] Aug. 31, 1976

[54] NEMATIC LIQUID CRYSTAL COMPOSITIONS

[75] Inventors: Kenji Nakamura, Kamakura; Mashachika Yaguchi, Yokohama; Toshio Jinnai; Kazuo Totani, both of Kamakura; Shigetaro Furuta, Fujisawa; Masayoshi Nichogi, Oiso, all of Japan

[73] Assignee: Dai Nippon Toryo Kaubshiki Kaisha, Osaka, Japan

[22] Filed: Nov. 25, 1974

[21] Appl. No.: 527,096

[30] Foreign Application Priority Data
July 31, 1974 Japan.............................. 49-87083
Aug. 15, 1974 Japan.............................. 49-92821
Aug. 15, 1974 Japan.............................. 49-92822

[52] U.S. Cl............................ 350/160 LC; 252/299; 350/150
[51] Int. Cl.² ........................ C09K 3/34; G02F 1/13
[58] Field of Search............................ 252/299, 408; 350/160 LC, 150

[56] References Cited
UNITED STATES PATENTS

| | | | |
|---|---|---|---|
| 3,731,986 | 5/1973 | Fergason | 252/299 |
| 3,796,479 | 3/1974 | Helfrich et al. | 252/408 |
| 3,815,972 | 6/1974 | Hsieh | 252/299 |
| 3,872,140 | 3/1975 | Klanderman | 252/408 LC |
| 3,880,767 | 4/1975 | Chang et al. | 252/299 |
| 3,881,806 | 5/1975 | Suzuki | 252/299 |
| 3,891,307 | 6/1975 | Tsukamoto et al. | 350/160 LC |
| 3,900,248 | 8/1975 | Nagasaki | 350/160 LC |
| 3,923,857 | 12/1975 | Boller et al | 252/299 |

FOREIGN PATENTS OR APPLICATIONS

| | | | |
|---|---|---|---|
| 2,306,739 | 8/1973 | Germany | 252/299 |
| 2,321,632 | 11/1974 | Germany | 252/299 |
| 48-69775 | 9/1973 | Japan | 252/299 |
| 49-3888 | 4/1974 | Japan | 252/299 |
| 47-18783 | 9/1972 | Japan | 252/299 |
| 49-34487 | 3/1974 | Japan | 252/299 |
| 49-78683 | 7/1974 | Japan | 252/299 |

*Primary Examiner*—Benjamin R. Padgett
*Assistant Examiner*—T. S. Gron
*Attorney, Agent, or Firm*—Sughrue, Rothwell, Mion, Zinn & Macpeak

[57] ABSTRACT

By incorporating at least one of p-n-alkylcyanobenzene, p-cyanobenzylideneaniline and p-cyanophenyl p'-n-octyloxybenzoate into a Schiff base type nematic liquid crystal composition having negative dielectric anisotropy, a nematic liquid crystal composition having positive dielectric anisotropy is obtained. The nematic liquid crystal composition of the latter exhibits a liquid crystal state in a broad temperature range including room temperature and is useful for a torsion effect type electrooptical display device which can operate at low voltages.

21 Claims, 9 Drawing Figures

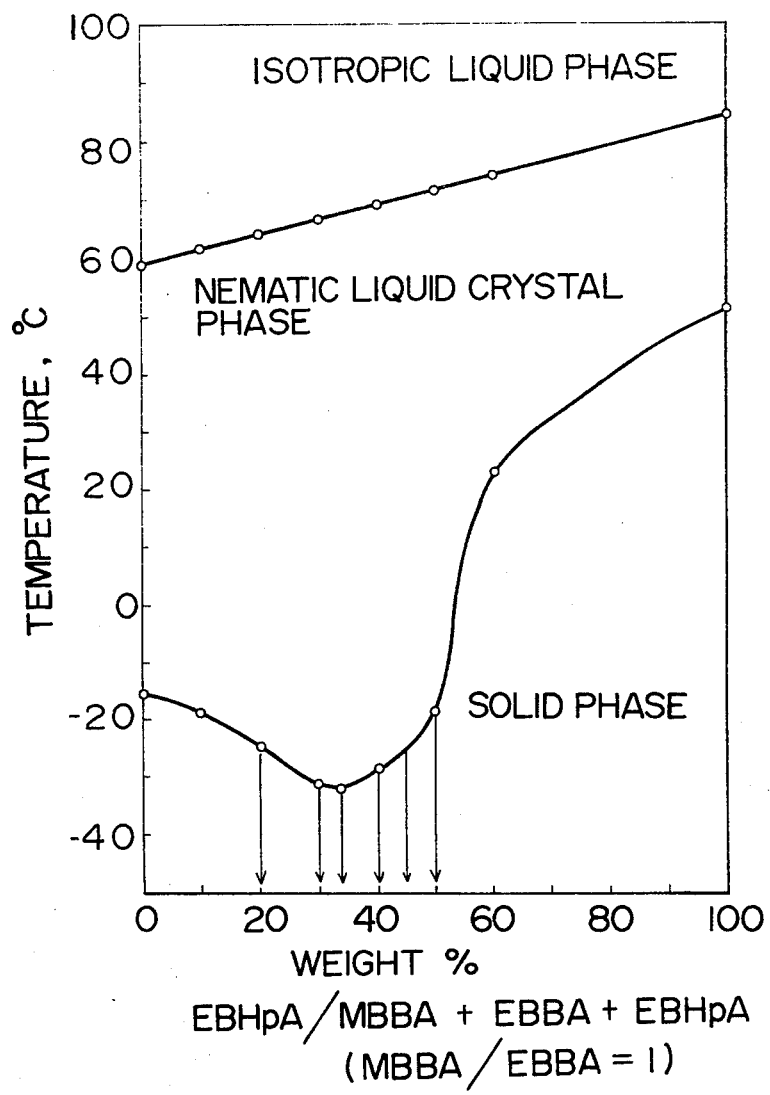

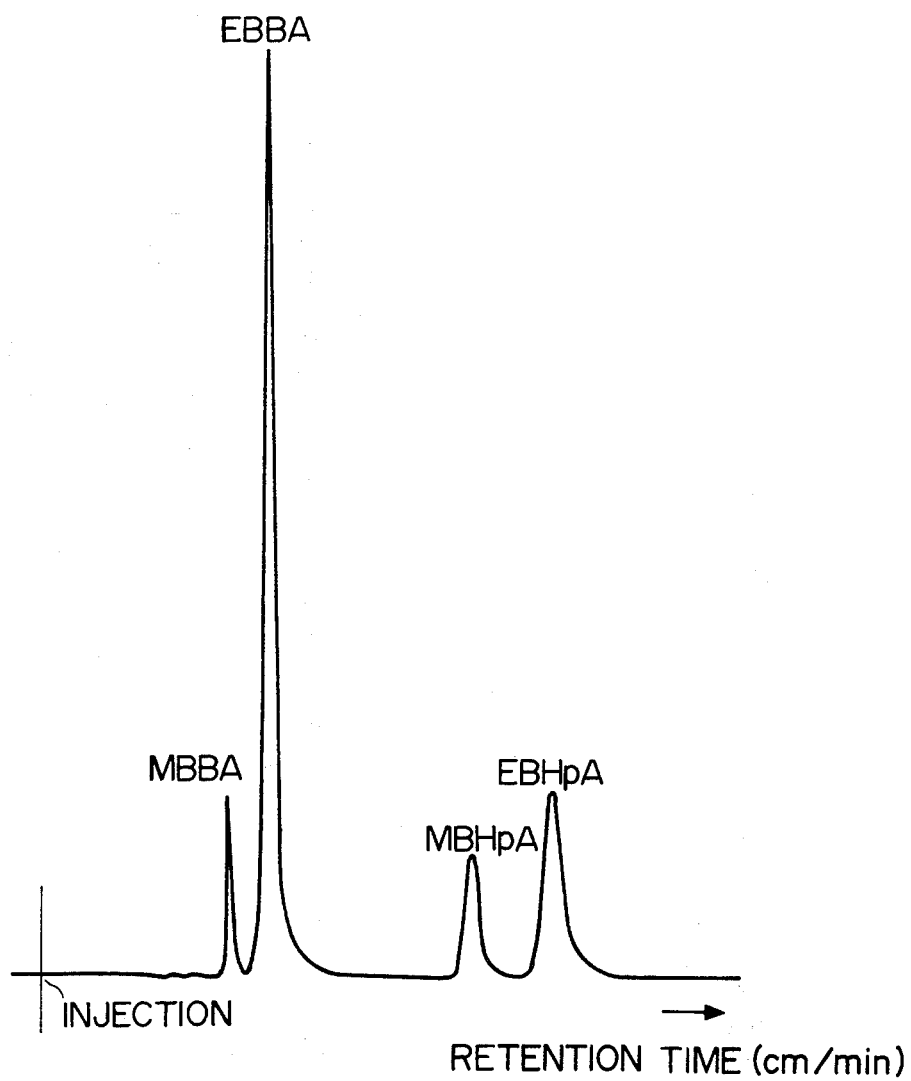

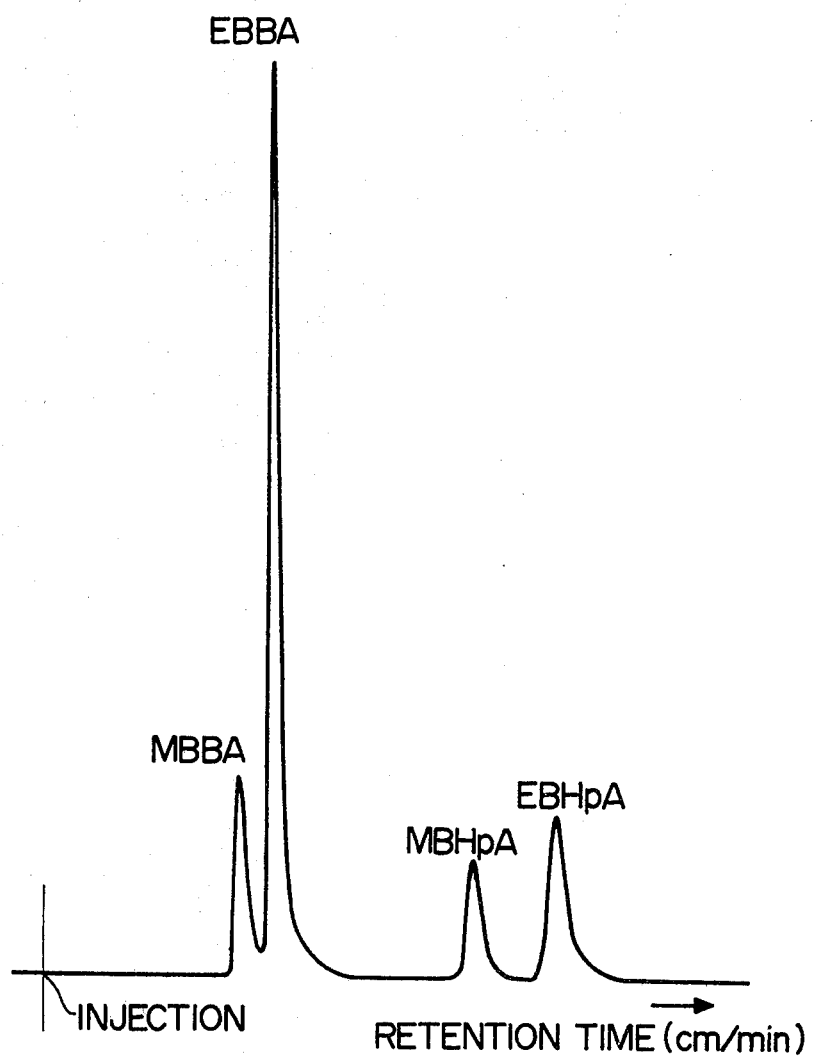

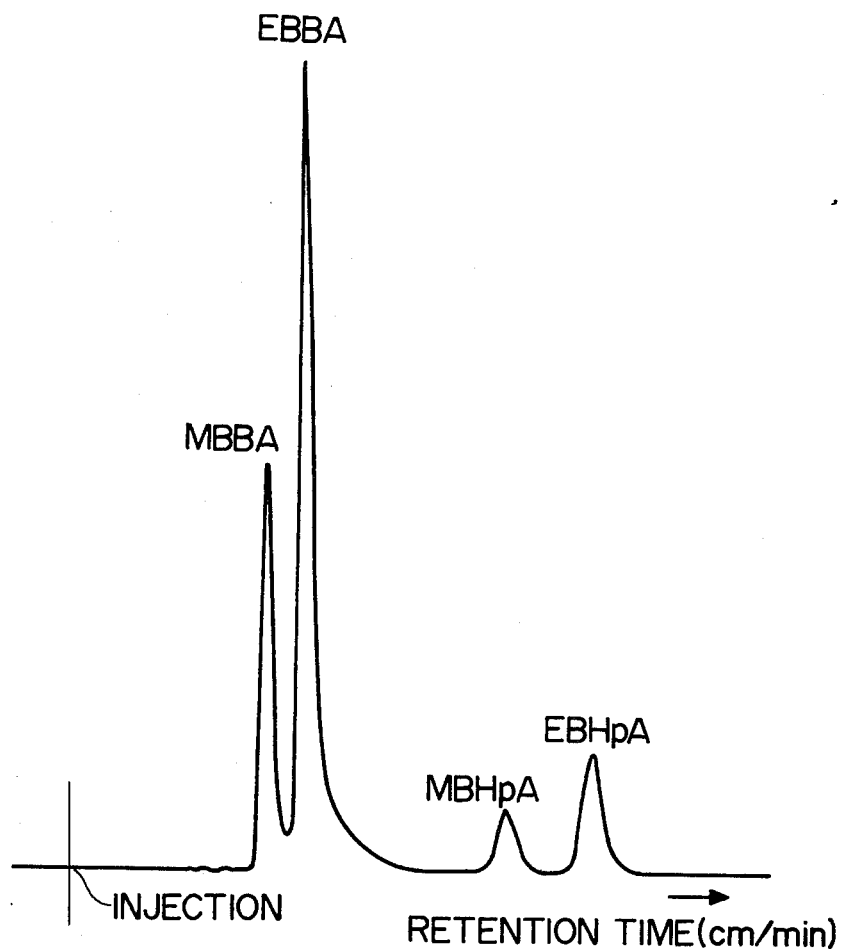

FIG. 3
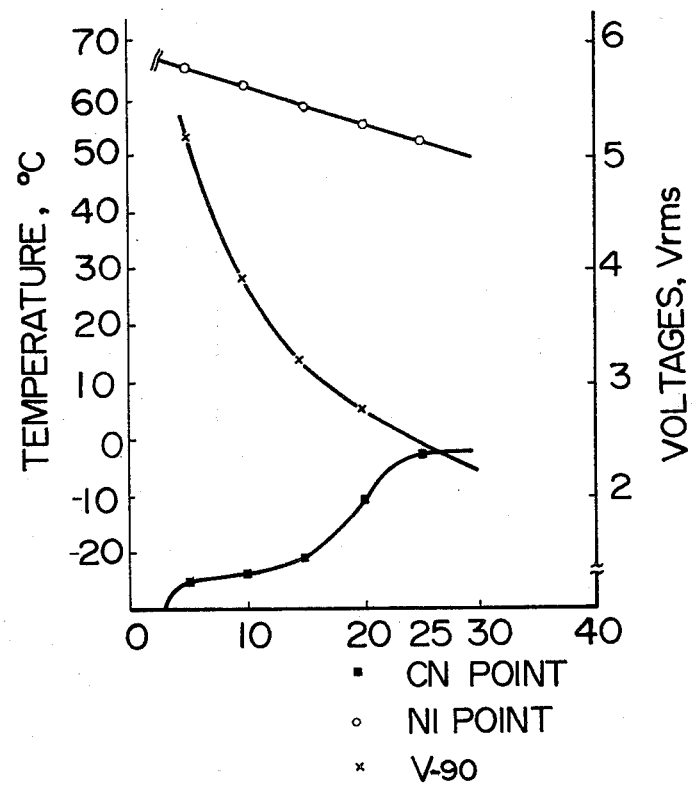
- CN POINT
○ NI POINT
× V-90
P-IMPARTING AGENT CONTENT
IN Np-LIQUID CRYSTAL COMPOSITION, Wt. %
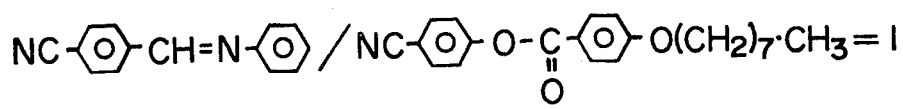

FIG. 4
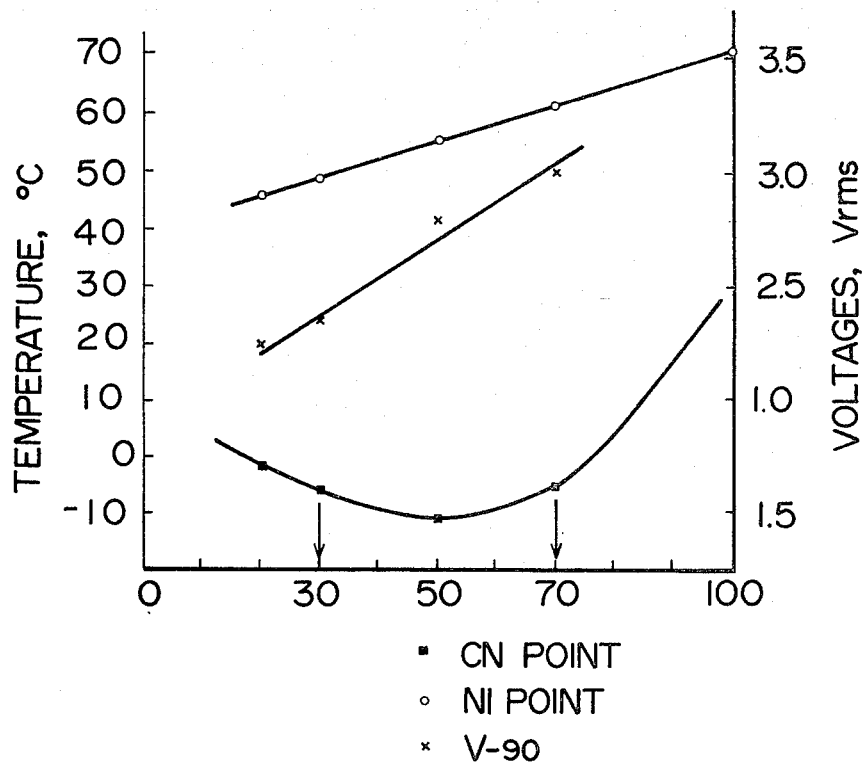
- ■ CN POINT
- ○ NI POINT
- × V-90
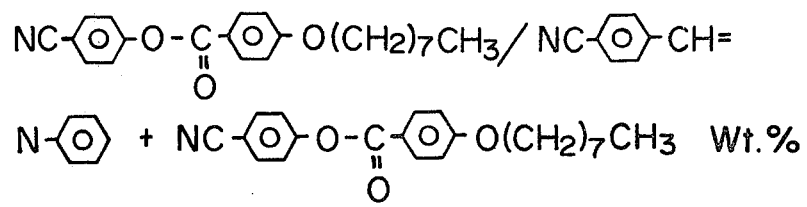
Wt.%

NEMATIC LIQUID CRYSTAL COMPOSITIONS

BACKGROUND OF THE INVENTION:

The present invention relates to a new nematic liquid crystal composition having positive dielectric anisotropy and more particularly, to a new nematic liquid crystal composition having positive dielectric anisotropy comprising a Schiff base-type nematic liquid crystal composition having negative dielectric anisotropy and a positive dielectric anisotropy-imparting agent.

Nematic liquid crystal materials (hereinafter referred to as N-liquid crystals) are used for electro-optical devices, because they are optically changed if an electric field is applied thereto. Electro-optical devices with use of N-liquid crystal may be divided into two groups according to dielectric anisotropy of the N-liquid crystal. One group comprises devices in which there is employed a dynamic scattering mode (DSM), i.e. an optical scattering phenomenon caused by collision of an ion and an Nn-liquid crystal molecule group when an electric field is applied to an N-liquid crystal having a molecular dipole moment in a direction substantially perpendicular to the longitude of the molecules, i.e. a nematic liquid crystal having negative dielectric anisotropy (hereinafter referred to as Nn-liquid crystal). Another group comprises devices in which there is employed an electric field effect mode (FEM), i.e. a change in lean or torsion of N-liquid crystal molecules caused by applying an electric field to an N-liquid crystal having a molecular dipole moment substantially parallel to the longitudinal direction of the molecules, i.e. a nematic liquid crystal having positive dielectric anisotropy (hereinafter referred to as Np-liquid crystal). Many of the latter FEM-type devices are so-called "torsion effect-type devices" (hereinafter referred to as TN-type device) wherein a change in torsion of Np-liquid crystal molecules (one of the electric field effect modes) is utilized. The Np-liquid crystal composition of the present invention is utilized for the TN-type device.

The TN-type device is prepared by applying a transparent conductive coating to one face of each of a pair of supports such as glass plates to obtain an electrode surface, then combining the pair of the plates in such a manner that the electrode surfaces are opposite to each other (distance between the electrode surfaces being usually 1 $\mu$ – 50 $\mu$) to obtain a cell and thereafter introducing Np-liquid crystal to the cell to fill the cell with the liquid crystal. In such a case, the electrode surfaces have been treated previously so that they have a predetermined orientation according to oblique incidence deposition or rubbing methods. The electrode plates are combined together at a proper distance in such a manner that the orientations caused by the treatment of the electrode surfaces are substantially perpendicular to each other. In thus obtained TN-type device, Np-liquid crystal molecules are oriented in such a manner that longitudes of the molecules are parallel to the electrode surface and in the same direction as the orientation caused by the treatment of the electrode surface and, further, they have about 90° torsion between the electrode surfaces. Pitch of the torsion of the Np-liquid crystal molecules is sufficiently larger as compared with wavelength of light and, accordingly, plan of polarization of linear polarized light perpendicular to the electrode plate is rotated by about 90°C. while it passes through the TN-type device. Consequently, the TN-type device intercepts the light between two polarizers arranged in such a manner that the light-oscillation planes are parallel to each other and, on the other hand, it allows the light to pass between two polarizers arranged in such a manner that the light-oscillation planes are perpendicular to each other. If a voltage is applied to the TN-type device, the longitude of the Np-liquid crystal molecules is inclined to the electric field according to the voltage applied. At a voltage higher than a certain value, the Np-liquid crystal molecules are arranged so that the longitude thereof is substantially parallel to the direction of the electric field. Under such a condition, contrary to the case of no application of voltage, the TN-type device allows light to pass between the parallel polarizers but intercepts the light between the perpendicular polarizers. The TN-type device is thus changed from light-interception state to light-passing state or from the light-passing state to the light-interception state according to the application of voltage. This light modulation is utilized for displays.

The TN-type device is usually operated according to an alternating current electric field of a square wave or the like. This is an excellent method of preventing the Np-liquid crystal which is an organic compound from deterioration due to electrolysis thereof. A TN-type display apparatus comprising the TN-type device placed between the two polarizers and a driving circuit for the TN-type device can be used as the display for electronic computers, electronic desk computers, electronic watches and various other measuring instruments.

In most display apparatus for the above-mentioned various instruments, display devices such as fluorescent indicator tubes, cathode discharge tubes, etc. are utilized. N-liquid crystal display devices are advantageous over these conventional display devices in that they are operated at lower voltages. As display devices to be operated at a voltage equal to or lower than the voltage at which N-liquid crystal display devices are operated, there can be mentioned light emitting diodes, but the N-liquid crystal devices are excellent over light emitting diodes in respect to consumption of electric power. Especially, TN-type display devices are excellent over DSM type display devices in the point that they are operated at lower voltages and provide images having a higher stability. The fact that display device is operated at a lower voltage means that the following advantages can be attained in constructing an display system. Namely, the connection of the device with an IC circuit or the like can be facilitated, planing of circuits is easily accomplished, the circuit reliability is improved, and consumption of electric power is reduced. Accordingly, extensive research work has been directed toward development of TN-type devices which can be operated at lower voltages within a broad temperature range including room temperature and in its turn, toward development of Np-liquid crystal materials for TN-type devices that can be operated at such lower voltages and exhibit a liquid crystal state within a broad temperature range including room temperature.

Known Np-liquid crystal compositions used for said TN-type device are obtained usually be incorporating a positive dielectric anisotropy-imparting agent (hereinafter referred to as P-imparting agent) into an Nn-liquid crystal or Nn-liquid crystal composition. Those Np-liquid crystal compositions have been disclosed in, for example, Japanese Application Kokai No.

18783/1972 and Japanese application Kokai No. 38888/1974.

SUMMARY OF THE INVENTION:

An object of the present invention is to provide a new Np-liquid crystal composition for the TN-type display device.

A further object of the present invention is to provide a new NP-liquid crystal composition for the TN-type display device capable of operating at low voltages and exhibiting a liquid crystal state within a broad temperature range including room temperature.

The Np-liquid crystal composition according to the present invention is a mixture of a Nn-liquid crystal composition consisting of p-methoxybenzylidene-p'-n-butylaniline (MBBA), p-ethoxybenzylidene-p'-n-butylaniline (EBBA), p-methoxybenzylidene-p'-n-heptylaniline (MBHpA) and p-ethoxybenzylidene-p'-n-heptylaniline (EBHpA), respectively represented by the formulae,

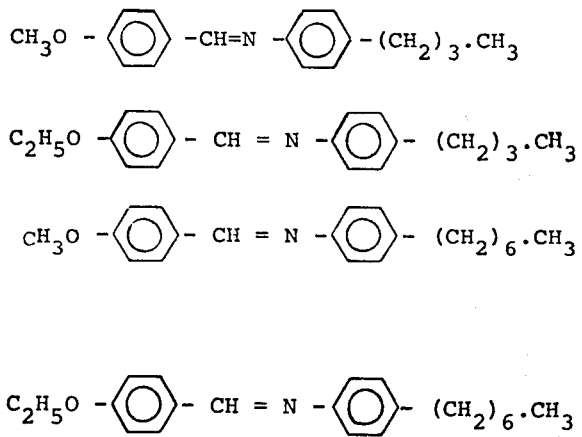

and at least one P-imparting agent selected from at least one p-n-alkylcyanobenzene having the formula

wherein R is a n-propyl, n-butyl, n-pentyl, n-hexyl, n-heptyl or n-octyl group, p-cyanobenzylideneaniline having the formula

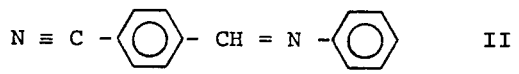

and p'-cyanophenyl p'-n-octyloxybenzoate having the formula

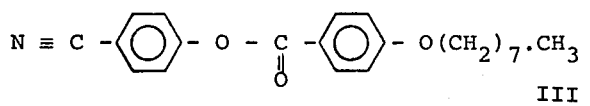

BRIEF EXPLANATION OF DRAWINGS:

FIG. 1 represents a phase diagram of Nn-liquid crystal composition of MBBA, EBBA and EBHpA (weight ratio of MBBA to EBBA being 1 : 1).

FIG. 3 represents relationships among amounts of P-imparting agents, crystal-nematic phase transition point (CN point), nematic-isotropic phase transition point (NI point) and voltage V-90 with which the amount of transmission light is changed by 90% relative to the quantity of transmission light under no application of voltages with respect to a Np-liquid crystal composition of the present invention.

FIG. 4 represents relationships of weight ratio of p-cyanobenzylideneaniline to p-cyanophenyl p'-n-octyloxybenzoate, CN point, NI point and V-90 with respect to a Np-liquid crystal composition of the present invention.

Figure 2C:
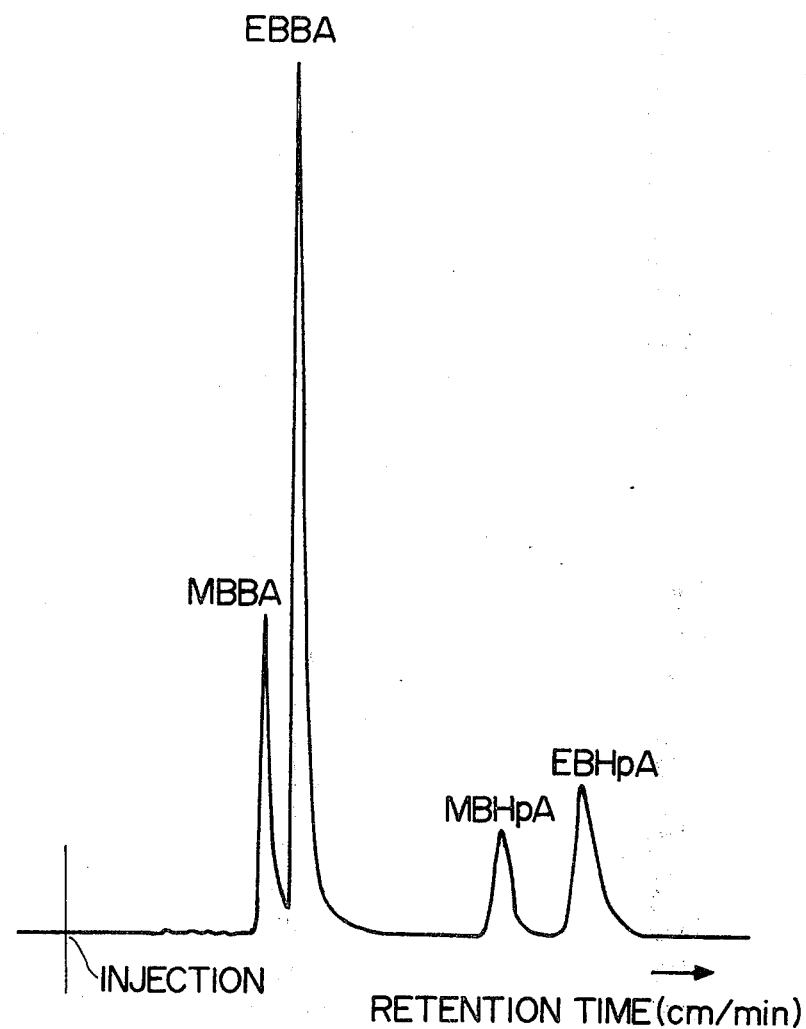
FIG. 2-$a$, FIG. 2-$b$, FIG. 2-$c$, FIG. 2-$d$, FIG. 2-$e$ and FIG. 2-$f$ each represents a gas/chromatogram of a Nn-liquid crystal composition obtained by mixing MBBA, EBBA and EBHpA in the EBHpA/MBBA + EBBA weight ratio of 1, 9/11, 2/3, 1/2, 3/7 and ¼, respectively, the weight ratio of MBBA TO EBBA being 1 : 1.

DETAILED DESCRIPTION OF THE INVENTION:

One of the most conventional Nn-liquid crystal compositions is an Nn-liquid composition consisting of a mixture of MBBA and EBBA in an equi-weight ratio. This Nn-liquid crystal composition exhibits a liquid crystal state within a broad temperature range including room temperature (−15°–58°C). If a proper amount of Schiff base Nn-liquid crystal EBHpA is added to said Nn-liquid crystal composition of MBBA and EBBA, the CN point is lowered and, on the other hand, the NI point is elevated. Thus, there can be obtained an Nn-liquid crystal composition having a wider nematic liquid crystal phase temperature range than that of the Nn-liquid crystal composition consisting of the mixture of MBBA and EBBA in an equi-weight ratio. As clearly shown in FIG. 1, the CN point of the Nn-liquid crystal composition obtained by incroporating EBHpA in the Nn-liquid crystal composition consisting of the mixture of MBBA and EBBA in an equi-weight ratio is lower than that of the latter Nn-liquid crystal composition, if EBHpA/MBBA + EBBA is below about 1 (MBBA : EBBA : EBHpA = 1 : 1 : 2). On the other hand, the NI point is elevated as the amount of EBHpA added is increased. with due regard to CN point, it is noted that, if EBHpA/MBBA + EBBA is below about 1 (MBBA : EBBA : EMBpA = 1 : 1 : 2), a nematic liquid crystal phase temperature range or mesomorphic range of the Nn-liquid crystal composition consisting of the equi-weight mixture of MBBA and EBBA and EBHpA is larger than that of the equi-weight mixture of MBBA and EBBA. Particularly, a preferred mesomorphic range can be obtained if EBHpA/MBBA+EBBA of the Nn-liquid crystal composition is roughly in the range of from ½ (MBBA : EBBA : EBHpA = 2 : 2 : 1) to 9/11 (MBBA : EBBA : EBHpA = 11 : 11 : 18). Far more preferred is an Nn-liquid crystal composition in which EBHpA/MBBA+EBBA is in the range of from about 3/7 (MBBA : EBBA : EBHpA = 7 : 7: 6) to 2/3 (MBBA : EBBA : EBHpA = 3 : 3 : 4). Most preferred is an N-liquid crystal composition in which EBHpA/MBBA+EBBA is about 1/2 (MBBA : EBBA : EBHpA = 1 : 1 : 1) which has the lowest CN point and which exhibits a wide mesomorphic range extending above and below room temperature. The Nn-liquid crystal composition which is a matrix of the Np-liquid crystal composition of the present invention is said Schiff base nn-liquid crystal composition obtained by incorporating EBHpA into the Nn-liquid crystal composition consisting of the mixture of MBBA and EBBA in equivalent parts by weight.

The above-mentioned Schiff base Nn-liquid crystal Composition obtained by mixing MBBA, EBBA and EBHpA contains practically p-methoxybenzylidene-p'-n-heptylaniline (hereinafter referred to as MBHpA) in addition to MBBA, EBBA and EBHpA. this fact has been disclosed in, for example, Japanese Application Kokai No. 69775/1973. The inventors have also confirmed according to gas/chromatography that the Nn-liquid crystal composition obtained from mixing of MBBA, EBBA and EBHpA further contains MBHpA. Amounts of MBBA, EBBA, EBHpA and MBHpA contained in respective Nn-liquid crystal compositions calculated on the basis of the results shown in FIG. 2-a, FIG. 2-b, FIG. 2-c, FIG. 2-d, FIG. 2-e and FIG. 2-f are as shown in Table 1.

wherein R represents an n-alkyl group of 3–8 carbon atoms and X represents Cl or Br. This synthesis process is not difficult for organic chemists.

One or a mixture of two or more members of the p-n-alkylcyanobenzenes prepared by the above process exhibits an excellent miscibility with the matrix Nn-liquid crystal composition consisting of MBBA, EBBA, EBHpA and MBHpA, if the former is used in a proper amount. By the addition of the p-n-alkylcyanobenzene(s) to the nn-liquid crystal composition, the latter is converted to a stable Np-liquid crystal composition from which the p-n-alkylcyanobenzene is not separated or deposited even after allowing it to stand for long periods of time. The amount of p-n-alkylcyanobenzene must be in the range of 3–7% by weight based on the composition obtained by mixing the P-imparting agent and the Schiff base Nn-liquid crystal composition. If Table 1

Figure 2D:
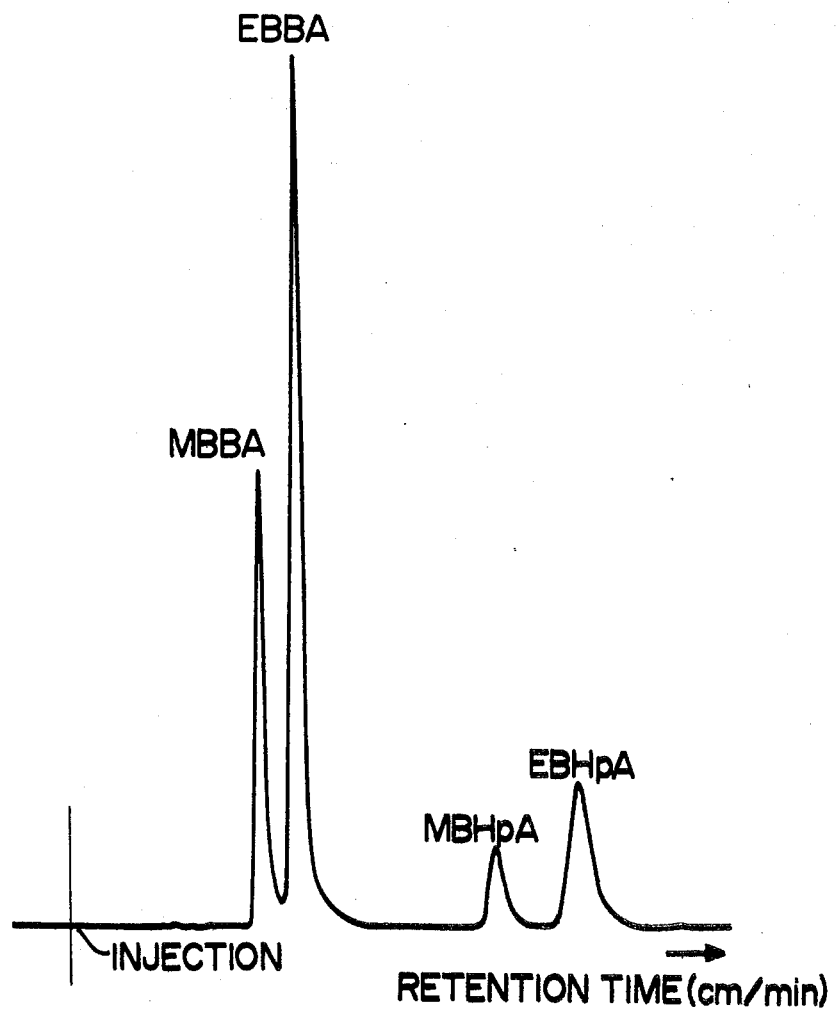
Figure 2F:
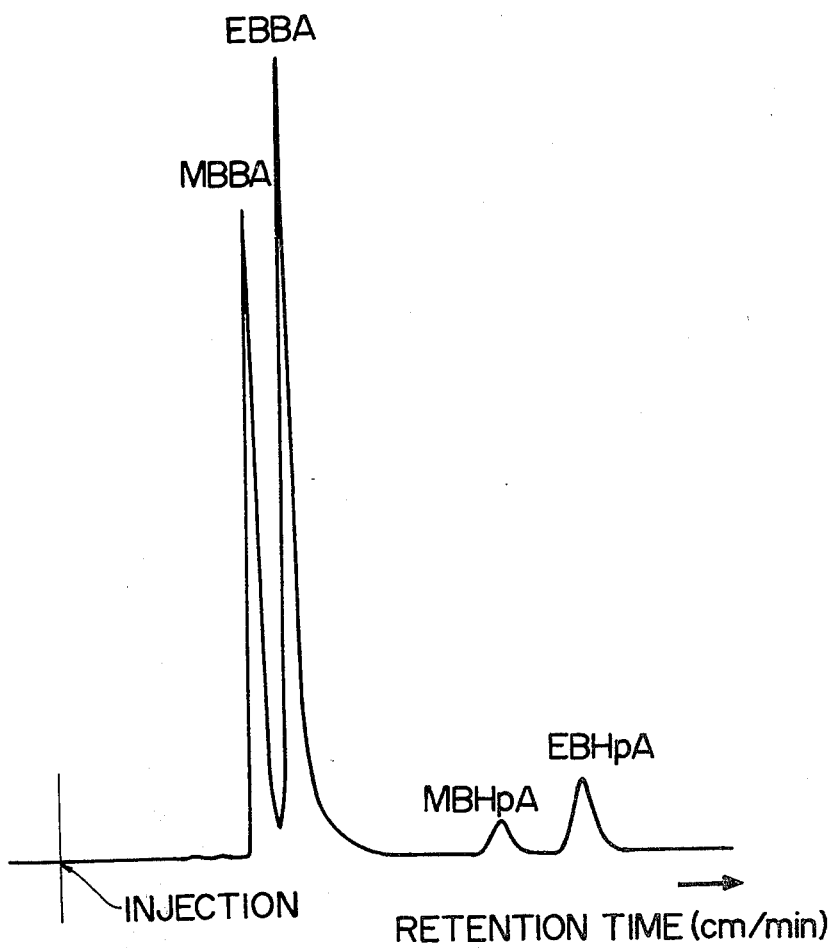

| FIG. 2 | Weight ratio of MBBA, EBBA and EBHpA | | MBBA, EBBA, EBHpA and MBHpA contents (wt.%) | | | |
|---|---|---|---|---|---|---|
| | EBHpA/ MBBA +EBBA | MBBA:EBBA:EBHpA | MMBA | EBBA | EBHpA | MBHpA |
| a | 1 | 1 : 1 : 2 | 5 | 57 | 23 | 15 |
| b | 9/11 | 11 : 11 : 18 | 9 | 56 | 21 | 14 |
| c | 2/3 | 3 : 3 : 4 | 13 | 54 | 20 | 13 |
| d | 1/2 | 1 : 1 : 1 | 19 | 53 | 18 | 10 |
| e | 3/7 | 7 : 7 : 6 | 22 | 52 | 17 | 9 |
| f | 1/4 | 2 : 2 : 1 | 31 | 50 | 14 | 5 |

The inventors thus prepared the Nn-liquid crystal composition substantially consisting of MBBA, EBBA, EBHpA and MBHpA which is the matrix of the Np-liquid crystal composition of the present invention by mixing MBBA, EBBA and EBHpA. As a matter of course, the Nn-liquid crystal composition can be prepared also by mixing MBBA, EBBA, EBHpA and MBHpA, by mixing MBBA, EBBA and MBHpA, by mixing MBBA and EBHpA or by mixing EBBA and MBHpA.

Reference will be made to the P-imparting agent to be added to the Schiff base Nn-liquid crystal composition.

One of the P-imparting agents used for the new Np-liquid crystal composition of the present invention comprises at least one p-n-alkylcyanobenzene represented by the formula:

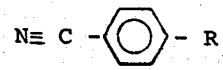

wherein R represents a n-propyl, n-butyl, n-pentyl, n-hexyl, n-heptyl or n-octyl group.

The p-n-alkylcyanobenzene can be synthesized by, for example, reacting p-n-alkylchlorobenzene or p-n-alkylbromobenzene with copper cyanide in dimethylformamide or n-methylpyrrolidone as solvent. The reaction can be represented by the following formula:

p-n-alkylcyanobenzene is in an amount of less than 3 wt.%, the P-imparting effect cannot be obtained. In other words, the Nn-liquid crystal composition cannot be converted to the Np-liquid crystal composition. The P-imparting effect is obtained when the p-n-alkylcyanobenzene P-imparting agent is used in an amount of more than 3 wt.%. The effect is improved as p-n-alkylcyanobenzene is increased in amount up to 7 wt.% (upper limit). The reason why the upper limit is provided is that, though the P-imparting effect is improved as p-n-alkylcyanobenzene is increased in amount, the miscibility of the matrix Schiff base nn-liquid crystal composition with the p-n-alkylcyanobenzene cannot be obtained and the p-n-alkylcyanobenzene is separated out if the P-imparting agent is more than 7 wt.%. Further, as the p-n-alkylcyanobenzene is increased, the NI point of the resulting Np-liquid crystal composition is inclined to be lowered. If p-n-alkylcyanobenzene is more than 7 wt.%, the NI point is lowered remarkably. Thus, in the case where p-n-alkylcyanobenzene is more than 7 wt.%, the mesomorphic range of the resulting Np-liquid crystal composition is unfavorably far narrower than that of the matrix Schiff base Nn-liquid crystal composition.

Two P-imparting agents to be used in the Np-liquid crystal composition of this invention, that are different from the above-mentioned p-n-alkyl cyanobenzene, namely p-cyanobenzylideneaniline and P-cyanophenyl p'-n-octyloxybenzoate, will now be described.

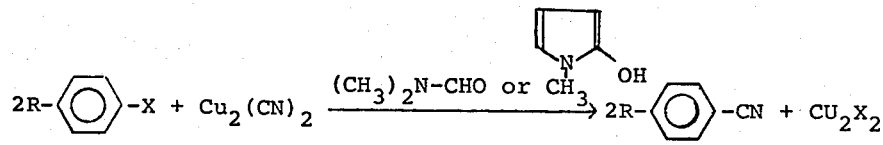

When a Schiff base derivative represented by the following general formula

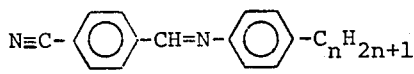

wherein $n$ is an integer of from 0 to 8, is incorporated into the above-mentioned Nn-liquid crystal composition of MBBA, EBBA, EBHpA and MBHpA, the resulting composition is converted to an Np-liquid crystal composition having a relatively low operation voltage. In short, Schiff bases represented by the above general formula are P-imparting agents, and among them, p-cyanobenzylideneaniline having the following chemical formula

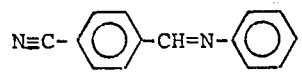

is especially effective as the P-imparting agent. When this compound in incorporated into an Nn-liquid crystal composition of MBBA, EBBA, EBHpA and MBHpA, the resulting composition has a lowest operation voltage among compositions formed by addition of the foregoing Schiff base derivatives. Eight Np-liquid crystal compositions were prepared by incorporating 10 and 20% by weight of p-cyanobenzylideneaniline, p-cyanobenzylidene-p'-n-butylaniline, -p-cyanobenzylidene-p'-n-hexylaniline and p-cyanobenzylidene-p'n-octylaniline as the P-imparting agent into 90 and 80% by weight of an Nn-liquid crystal composition consisting essentially of MBBA, EBBA, EBHpA and MBHpA obtained by mixing MBBA, EBBA and EBHpA in equal amounts, and these compositions were compared in respect to the operation voltage. Namely, with respect to each composition, the voltages V-10 and V-90 at which the quantity of transmission light was changed by 10% and 90%, respectively, relative to the quantity of transmission light under no application of voltages were determined. The results are shown in Table 2. The determination of the above voltages was conducted by using the same cells having an electrode surface coated with a nitrocellulose layer of a thickness of about 1 u (the spacing between the electrode surfaces being 7 ± 1.5 u). In the above cells, each nitrocellulose layer on the electrode surface was rubbed in a certain direction under a pressure of 50 g/cm², and the rubbing directions of both the layers crossed each other. (All of the V-10 and V-90 values were determined under the same conditions.)

As is apparent from Table 2, p-cyanobenzylideneaniline gives an Np-liquid crystal composition to be operated at the lowest voltage among the above P-imparting agents, when compared based on the same amount. Further, as the amount of p-cyanobenzylideneaniline is larger, the resulting Np-liquid crystal composition is operated at a lower voltage. Thus, p-cyanobenzylideneaniline is one of the P-imparting agents that can be used for the Np-liquid crystal composition of this invention. The Np-liquid crystal composition including p-cyanobenzylideneaniline can be operated at a low voltage. p-cyanobenzylideneaniline can be synthesized, for example, by heating and agitating an equimolar mixture of p-cyanobenzyldehyde and aniline in ethanol as solvent under reflux for two hours. This reaction is expressed by the following formulae:

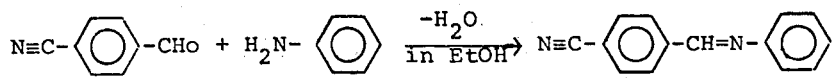

The reaction product can be purified by recrystallization from ethanol. So obtained p-cyanobenzylideneaniline has a melting point of 98°C.

p-cyanobenzylideneaniline has a good miscibility with a Schiff base Nn-liquid crystal composition of MBBA, EBBA, EBHpA and MBHpA, and when the compound is incorporated into this Nn-liquid crystal composition, the resulting composition is converted to an np-liquid crystal composition. The so obtained Np-liquid crystal composition is stable, and even when it is allowed to stand still for a long time, separation or deposition of p-cyanobenzylideneaniline is not observed at all.

The Np-liquid crystal composition obtained by adding p-cyanobenzylideneaniline to an Nn-liquid crystal composition of MBBA, EBBA, EBHpA and MBHpA is operated at a low voltage as shown in Table 2, and there is a tendency that this operation voltage is lowered with increase of the amount of p-cyanolbenzylideneaniline. However, as the amount of p-cyanobenzylideneaniline increases, the nematic liquid crystal phase temperature range or mesomorphic range is gradually narrowed in the resulting Np-liquid crystal composition. For example, when p-cyanobenzylideneaniline occupies 10% by weight of the Np-liquid crystal composition, the nematic liquid crystal phase temperature range or mesomorphic range is from −20°C. to 51°C., and when the amount of p-cyanobenzylideneaniline is 20% by weight, the above range is from 10 to 40°C. From the practical viewpoint, this narrowing of the nematic liquid crystal phase temperature range or mesomorphic range is not preferred. Accordingly, the amount of this effective P-imparting agent, p-cyanobenzylideneaniline should naturally be Table 2

| P-imparting agents | Amount (% by weight) | V-10 (Vrms) | V-90 (Vrms) |
|---|---|---|---|
| N≡C—⌬—CH=N—⌬ | 10<br>20 | 2.7<br>1.9 | 3.8<br>3.4 |
| N≡C—⌬—CH=N—⌬—(CH$_2$)$_3$·CH$_3$ | 10<br>20 | 2.9<br>1.9 | 4.8<br>4.1 |
| N≡C—⌬—CH=N—⌬—(CH$_2$)$_5$·CH$_3$ | 10<br>20 | 3.8<br>2.7 | 6.0<br>3.9 |
| N≡C—⌬—CH=N—⌬—(CH$_2$)$_7$·CH$_3$ | 10<br>20 | 4.3<br>2.9 | 6.0<br>4.3 | limited. In general, the P-imparting effect of a P-imparting agent is enhanced with increase of the amount added In the Np-liquid crystal composition of this invention, when p-cyanobenzylideneaniline is used in combination with another kind of a P-imparting agent, the amount of the P-imparting agent can be increased while preventing such narrowing of the nematic liquid crystal phase temperature as observed in the case of single use of p-cyanobenzylideneaniline, p'-n-butyloxybenzoate and p-cyanophenyl p'-n-methoxybenzoate to 80% by weight of an Nn-liquid crystal composition consisting essentially of MBBA, EBBA, EBHpA and MBHpA obtained by mixing MBBA, EBBA and EBHpA in equal amounts, and the states observed when these Np-liquid crystal compositions were allowed to stand still at −10°C. and the NI points of these Np-liquid crystal compositions were shown in Table 3.

Table 3

| Benzoic Acid Phenyl Ester Derivative | State at −10°C.* | NI Point (°C.) |
|---|---|---|
| N≡C—⟨⟩—O—C(=O)—⟨⟩—O(CH₂)₇·CH₃ | liquid crystal state no deposition | 56 |
| N≡C—⟨⟩—O—C(=O)—⟨⟩—O(CH₂)₆·CH₃ | liquid crystal state, local deposition | 55 |
| N≡C—⟨⟩—O—C(=O)—⟨⟩—O(CH₂)₅·CH₃ | liquid crystal state, local deposition | 55.5 |
| N≡C—⟨⟩—O—C(=O)—⟨⟩—O(CH₂)₄·CH₃ | deposition | 57 |
| N≡C—⟨⟩—O—C(=O)—⟨⟩—O(CH₂)₃·CH₃ | separation | 58 |
| N≡C—⟨⟩—O—C(=O)—⟨⟩—OCH₃ | separation | 61 |

*Deposition: a small amount of the additive was deposited
Separation: the majority of the additive was separated and deposited and was in the solidified state and hence, the P-imparting effect can be enhanced.

It was found that when p-cyanobenzylideneaniline is used in combination with a benzoic acid phenyl ester represented by the following general formula:

$$N\equiv C-\langle O \rangle-O-\underset{O}{\overset{\|}{C}}-\langle O \rangle-OC_nH_{2n+1}$$

wherein n is an integer of from 4 to 8, a relatively good Np-liquid crystal composition can be obtained, and that when p-cyanophenyl p'-n-octyloxybenzoate of the following formula $$N\equiv C-\langle O \rangle-O-\underset{O}{\overset{\|}{C}}-\langle O \rangle-O(CH_2)_7\cdot CH_3$$

is especially selected from such phenyl esters and it is used in combination with p-cyanobenzylideneaniline, a good Np-liquid crystal composition can be obtained, which is operated at a low voltage and exhibits a liquid crystal state within a broad temperature range including room temperature.

Six kinds of Np-liquid crystal compositions were prepared by adding 10% by weight of p-cyanobenzylideneaniline and 10% by weight of p-cyanophenyl p'-n-octyloxybenzoate, p-cyanophenyl p'-n-butyloxybenzoate, p-cyanophenyl p'-n-hexyloxybenzoate, p-cyanophenyl p'-n-pentyloxybenzoate, p-cyanophenyl From Table 3, it will readily be understood that when p-cyanophenyl p'-n-octyloxybenzoate is employed in combination with p-cyanobenzylideneaniline, an Np-liquid crystal composition having most preferred properties can be obtained. When incorporated in a suitable amount, p-cyanophenyl p'-n-octyloxybenzoate is good miscibility with both an Nn-liquid crystal composition of MBBA, EBBA, EBHpA and MBHpA and p-cyanobenzylideneaniline, and therefore, a good Np-liquid crystal composition which is operated at a low voltage and exhibits a liquid crystal state within a broad temperature range including room temperature can be obtained by mixing the above-mentioned three components.

p-cyanophenyl p'-n-octyloxybenzoate is synthesized, for example, by dehydroxhlorinating and condensing an equimolar mixture of p-cyanophenol and p-n-octyloxybenzoyl chloride in benzene as solvent in the presence of pyridine. This reaction is expressed by the following reaction formulae:

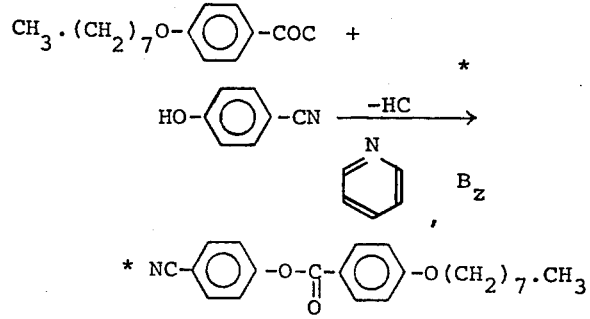

The reaction product can be purified by recrystallization from ethanol. Incidentally, p-n-octyloxybenzoyl chloride is obtained by reacting p-n-octyloxybenzoic acid with thionyl chloride. p-cyanophenyl p'-n-octyloxybenzoate per se is an Np-liquid crystal, and its nematic liquid crystal phase temperature range is from 76° to 87°C., and it has a P-imparting effect on a Schiff base Nn-liquid crystal composition of MBBA, EBBA, EBHpA and HBHpA. However, the P-imparting effect is lower than that of p-cyanobenzylideneaniline, and an Np-liquid crystal composition formed by adding p-cyanophenyl p'-n-octyloxybenzoate to the above Schiff base Nn-liquid crystal composition is not operated at such a low voltage as the Np-liquid crystal composition including p-cyanobenzylideneaniline as the P-imparting agent is operated.

The mixing weight ratio of the two P-imparting agents to the Schiff base Nn-liquid crystal composition which is the matrix of the Np-liquid crystal composition of this invention formed by adding p-cyanobenzylideneaniline and p-cyanophenyl p'-n-octyloxybenzoate to a Schiff base Nn-liquid crystal composition of MBBA, EBBA, EBHpA and MBHpA, and the weight ratio of the two P-imparting agents, namely p-cyanobenzylideneaniline and p-cyanophenyl p'-n-octyloxybenzoate, will now be described.

FIG. 3 illustrates the relations of the amount of the P-imparting agents to the CN point and NI point of the Nn-liquid crystal composition and the voltage (V-90) at which the quantity of transmission light is changed by 90% as compared with the quantity of transmission light under no application of voltages, said relations being observed with respect to an Np-liquid crystal composition obtained by adding the above two P-imparting agents (the mixing weight ratio of p-cyanobenzylideneaniline to p-cyanophenyl p'-n-octyloxybenzoate being 1 : 1) to a Schiff base Nn-liquid crystal composition consisting substantially of MBBA, EBBA, EBHpA and MBHpA, which is formed by mixing MBBA, EBBA and EBHpA in equal amounts. As is seen from FIG. 3, the CN point increases with increase of the amount of the P-imparting agents, while the NI point decreases with increase of the amount of the P-imparting agents. In short, the nematic liquid crystal phase temperature range in the Np-liquid crystal composition is narrowed with increase of the amount of the P-imparting agents. The V-90 value abruptly begins to decrease when the amount of the P-imparting agents exceeds 5% by weight, and the V-90 value is lowered with increase of the amount of the P-imparting agents. When the amount of the P-imparting agents exceeds 25% by weight, the miscibility between the P-imparting agents and the Schiff base Nn-liquid crystal composition as the matrix is lost. From the foregoing, it is seen that when the amount of the P-imparting agents is within a range of from 5 to 25% by weight, namely the mixing weight ratio of Schiff base Nn-liquid crystal composition to P-imparting agents is within a range of 19 : 1 to 3 : 1, a good Np-liquid crystal composition can be obtained.

FIG. 4 illustrates the relations of the mixing weight ratio of p-cyanobenzylideneaniline and p-cyanophenyl p'-n-otyloxybenzoate to the CN and NI points of the Np-liquid crystal composition and the V-90 value, said relations being observed with respect to an Np-liquid crystal composition obtained by adding 20% by weight of a mixed P-imparting agent of p-cyanobenzylideneaniline and p-cyanophenyl p'-n-octyloxybenzoate to 80% by weight of a Schiff base Nn-liquid crystal composition consisting essentially of MBBA, EBBA, EBHpA and MBHpA, which is formed by mixing MBBA, EBBA and EBHpA in equal amounts. As is seen from FIG. 4, the CN point is lowered as the proportion of p-cyanophenyl p'-n-octyloxybenzoate increases, and the CN point has the lowest value when the amount of p-cyanophenyl p'-n-octyloxybenzoate is 50% by weight based on the sum of the two P-imparting agents. If the amount of p-cyanophenyl p'-n-octyloxybenzoate exceeds 50% by weight, the CN point increases again with increase of the amount of p-cyanophenyl p'-n-octyloxybenzoate. The NI point increases gradually with increase of the proportion of p-cyanophenyl p'-n-octyloxybenzoate. Further, the V-90 value increases with increase of p-cyanophenyl p'-n-octyloxybenzoate. In other words, the V-90 value is lowered as the proportion of p-cyanobenzylideneaniline increases. From the foregoing, it is seen that when the mixing weight ratio of p-cyanobenzylideneaniline to p-cyanophenyl p'-n-octyloxybenzoate is within a range of from 7 : 3 to 3 : 7, an Np-liquid crystal composition having both good operation voltage and broad nematic liquid crystal phase temperature range including room temperature can be obtained. If stress is laid on the CN point, best Np-liquid crystal compositions can be obtained when both the P-imparting agents are mixed in equal amounts.

Np-liquid crystal compositions obtained by adding two P-imparting agents, p-cyanobenzylideneaniline and p-cyanophenyl p'-n-octyloxybenzoate, to an Nn-liquid crystal composition of MBBA, EBBA, EBHpA and MBHpA can be operated at low voltages (the voltage V-10 at which the quantity of transmission light is changed by 10% as compared with the quantity of transmission light under no application of voltages is lower than about 4 V and the voltage V-90 at which the quantity of transmission light is changed by 90% is lower than about 5V) and exhibit a liquid crystal state within a broad temperature range including room temperature, if the above two P-imparting agents are incorporated in appropriate amounts, namely if the mixing weight ratio of Schiff base Nn-liquid crystal composition to two P-imparting agents is within a range of from 3 : 1 to 19 : 1 and the mixing weight ratio of p-cyanobenzylideneaniline to p-cyanophenyl p'-n-octyloxybenzoate is within a range of from 7 : 3 to 3 : 7.

When at least one P-imparting agent selected from the above-mentioned six p-n-alkylcyanobenzene P-imparting agents represented by the following general formula:

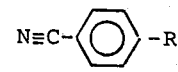

wherein R stands for a member selected from n-propyl, n-butyl, n-pentyl, n-hexyl, n-heptyl and n-octyl groups, is incorporated in an Np-liquid crystal composition formed by adding to an Nn-liquid crystal composition of MBBA, EBBA, EBHpA and HBHpA the above-mentioned two P-imparting agent p-cyanobenzyldeneaniline and p-cyanophenyl p'-n-octyloxbenzoate, in such amounts that the mixing weight ratio of Schiff base Nn-liquid crystal composition to two P-imparting agents is within a range of from 3 : 1 to 19 : 1 and the mixing weight ratio of p-cyanobenzylideneaniline to p-cyanophenyl p'-n-octyloxybenzoate is within a range of from 7 : 3 to 3 : 7, the resulting Np-liquid crystal composition can be operated at a much lower voltage and exhibits a liquid crystal state within a broad temperature range including room temperature. This Np-liquid crystal composition will now be described.

At least one P-imparting agent selected from p-n-alkylcyanobenzenes having 3 to 8 carbon atoms in the alkyl moiety, when incorporated in a suitable amount, exhibits a good miscibility with the matrix np-liquid crystal composition consisting of MBBA, EBBA, EBHpA, MBHpA, p-cyanobenzylideneaniline and p-cyanophenyl p'-n-octyloxybenzoate. The np-liquid crystal composition formed by incorporating at least one P-imparting agent selected from the above p-n-alkylcyanobenzenes having 3 to 8 carbon atoms in the alkyl moiety into the above matrix Np-liquid crystal composition is very stable and even when it is allowed to stand still for a long time, separation or deposition of the p-n-alkylcyanobenzene is not observed at all. As in the case of formation of the above Np-liquid crystal composition by incorporation of p-n-alkylcyanobenzene to a Schiff base Nn-liquid crystal composition, it is indispensable that the amount of p-n-alkylcyanobenzene should be within a range of from 3 to 7% by weight based on the total Np-liquid crystal composition. More specifically, when the amount of p-n-alkylcyanobenzene is smaller than 3% by weight, no substantial effect of reducing the operation voltage is obtained, and this effect is attained only when the amount of p-n-alkylcyanobenzene is 3% by weight or larger. This effect is enhanced with increase of the amount of p-n-alkylcyanobenzene, but the NI point of the resulting Np-liquid crystal composition tends to decrease with increase of the amount of p-n-alkylcyanobenzene and it is abruptly reduced when the amount of the P-imparting agent exceeds 7% by weight. Therefore, the allowable amount of p-n-alkylcyanobenzene is 7% by weight at largest. Thus, when the amount of p-n-alkylcyanobenzene increases, in the resulting Np-liquid crystal composition the range of temperatures exhibiting a liquid crystal state is much narrowed as compared with the said range of the matrix Np-liquid crystal composition. Furthermore, if p-n-alkylcyanobenzene is incorporated in an amount much larger than 7% by weight, its miscibility with the matrix Np-liquid crystal composition is lost and separation of p-n-alkylcyanobenzene occurs.

The Np-liquid crystal composition of this invention obtained by adding a suitable amount of at least one P-imparting agent selected from p-n-alkylcyanobenzenes having 3 to 8 carbon atoms in the alkyl moiety to the Np-liquid crystal composition of this invention formed by adding the two P-imparting agents, p-cyanobenzylideneaniline and p-cyanophenyl p'-n-octyloxybenzoate to a Schiff base Nn-liquid crystal composition of MBBA, EBBA, EBHpA and MBHpA can be operated at a lower voltage than the matrix Np-liquid crystal composition (the V-10 value is lower than about 2 volts and the V-90 value is lower than about 3 volts), and this Np-liquid crystal composition exhibits a liquid crystal state within a broad temperature range including room temperature.

As one factor indicating the reserve of the operation voltage (operation margin), there can be mentioned the V-90/V-10 value. The closer to 1 is this value, the greater is the operation margin. The Np-liquid crystal composition of this invention obtained by adding a suitable amount of at least one p-imparting agent selected from p-n-alkylcyanobenzenes having 3 to 8 carbon atoms in the alkyl moiety to the matrix Np-liquid crystal composition formed by adding the two p-imparting agents p-cyanobenzylideneaniline and p-cyanophenyl p'-n-octyloxybenzoate to an Nn-liquid crystal composition of MBBA, EBBA, EBHpA and MBHpA has a V-90/V-10 value much closer to 1 than the V-90/V-10 value of the matrix Np-liquid crystal composition. The above-mentioned Np-liquid crystal composition of this invention can be operated at a lower voltage and in addition, it has a greater operation margin. When such Np-liquid crystal composition having a greater operation margin is used for a TN-type display device and this TN-type display device is applied to the multi-plex drive system in which plural electrode segments on at least one electrode plate are integrated and electric fields differing in the voltage, the frequency, the duty ratio, etc. are applied to each of groups of segments to indicate optionally chosen segments, the driving can be greatly facilitated and crosstalk is hardly caused in this TN-type display device.

The above-mentioned NP-liquid crystal composition of this invention is novel and is used effectively as the Np-liquid crystal material for TN-type display devices.

The Np-liquid crystal composition, in which the kinds and amounts of p-imparting agents to be incorporated and the weight ratio of MBBA, EBBA, EBHpA and MBHpA in the matrix Nn-liquid crystal composition are specified as illustrated hereinabove, can be operated at a low voltage and exhibits a liquid crystal state within a broad temperature range including room temperature. Therefore, it can be said that the Np-liquid crystal composition of this invention has a very high practical value. Since a TN-type display device including the Np-liquid crystal composition of this invention can be operated at a low voltage, it can easily be connected to C-MOS, IC circuits, etc. in constructing a TN-type display system, and hence, planning of circuits can be facilitated and the reliability of circuits can be highly improved. Further, consumption of electric power can be greatly reduced. By virtue of these advantages, the range of selection of LSI, IC and the like for the driving circuit can be broadened and simultaneously, the size and weight of the TN-type display device can be much reduced.

The present invention will be illustrated by the following non-limitative examples.

EXAMPLE 1

MBBA, EBBA and EBHpA were mixed together in equi-part by weight to obtain Schiff base Nn-liquid crystal composition. Thus obtained Nn-liquid crystal composition (hereinafter referred to as composition-1) consists of MBBA, EBBA, EBHpA and MBHpA in amounts (wt. %) as shown in the above Table 1-d. Then, 3 wt. % of p-n-propylcyanobenzene were added to 97 wt. % of composition-1 and the whole was stirred to obtain Np-liquid crystal composition. The Np-liquid crystal composition had a mesomorphic range for from $-20°C$ to $68°C$. As for operating voltage of a TN-type device using the Np-liquid crystal composition, voltages V-10 and V-90 with which quantity of transmission light is changed by 10% and 90%, respectively, as compared with that of a case of no application of voltage were 5.7 Vrms. and 7.6 Vrms., respectively. Said TN-type device comprised a cell both electrode surfaces of which were coated with nitrocellulose resin of about 1 $\mu$ in thickness (distance between the two electrode surfaces being $7 \pm 1.5$ $\mu$) which cell was filled with said Np-liquid crystal composition. Both nitrocellulose coatings of the cell had been rubbed under a pressure of 50 g/cm² to have a predetermined orientation. The orientation caused by the rubbing were substantially perpendicular to each other. Operating voltage of the TN-type device was determined by employing square wave of a frequency of 32 Hz at 25°C. (In the following examples, the same cell of TN-type device was used and operating voltages of the TN-type device were determined under the same conditions as above.)

EXAMPLE 2

5 wt. % of p-n-propylcyanobenzene were added to 95 wt. % of composition-1 and the whole was stirred to obtain Np-liquid crystal composition. The Np-liquid crystal composition had a mesomorphic range of from −20°C to 67°C. TN-type device using thus obtained Np-liquid crystal composition had a V-10 and V-90 of 4.0 Vrms., and 6.4 Vrms., respectively.

EXAMPLE 3

7 wt. % of p-n-propylcyanobenzene were added to 93 wt. % of composition-1 and the whole was stirred to obtain Np-liquid crystal composition. The Np-liquid crystal composition had a mesomorphic range for from −20°C to 67°C. TN-type device using thus obtained Np-liquid crystal composition had V-10 and V-90 of 3.2 Vrms., and 5.2 Vrms., respectively.

EXAMPLE 4

3 wt. % of p-n-butylcyanobenzene were added to 97 wt. % of composition-1 and the whole was stirred to obtain Np-liquid crystal composition. The Np-liquid crystal composition had a mesomorphic range of from −20°C to 60°C. TN-type device using thus obtained Np-liquid crystal composition had V-10 and V-90 of 5.9 Vrms., and 7.8 Vrms., respectively.

EXAMPLE 5

5 wt. % of p-n-butylcyanobenzene were added to 95 wt. % of composition-1 and the whole was stirred to obtain Np-liquid crystal composition. The Np-liquid crystal composition had a mesomorphic range of from −20°C to 55°C. TN-type device using thus obtained Np-liquid crystal composition had V-10 and V-90 of 4.0 Vrms., and 6.5 Vrms., respectively.

EXAMPLE 6

7 wt. % of p-n-butylcyanobenzene were added to 93 wt. % of composition-1 and the whole was stirred to obtain Np-liquid crystal composition. The Np-liquid crystal composition had a mesomorphic range of from −20°C to 51°C. TN-type device using thus obtained N-liquid crystal composition had V-10 and V-90 of 3.5 Vrms., and 4.5 Vrms., respectively.

EXAMPLE 7

3 wt. % of p-n-pentylcyanobenzene were added to 97 wt. % of composition-1 and the whole was stirred to obtain Np-liquid crystal composition. The Np-liquid crystal composition had a mesomorphic range of from −20°C to 61°C. TN-type device using thus obtained Np-liquid crystal composition had V-10 and V-90 of 5.7 Vrms., and 7.8 Vrms., respectively.

EXAMPLE 8

5 wt. % of p-n-pentylcyanobenzene were added to 95 wt. % of composition-1 and the whole was stirred to obtain np-liquid crystal composition. The Np-liquid crystal composition had a mesomorphic range of from −18°C to 57°C. TN-type device using thus obtained Np-liquid crystal composition had V-10 and V-90 of 4.2 Vrms., and 6.4 Vrms., respectively.

EXAMPLE 9

7 wt. % of p-n-pentylcyanobenzene were added to 93 wt. % of composition-1 and the whole was stirred to obtain Np-liquid crystal composition. The Np-liquid crystal composition had a mesomorphic range of from −16°C to 51°C. TN-type device using thus obtained N-liquid crystal composition had V-10 and V-90 of 3.4 Vrms., and 4.6 Vrms., respectively.

EXAMPLE 10

3 wt. % of p-n-hexylcyanobenzene were added to 97 wt. % of composition-1 and the whole was stirred to obtain Np-liquid crystal composition. The Np-liquid crystal composition had a mesomorphic range of from −20°C to 61°C. TN-type device using thus obtained Np-liquid crystal composition had V-10 and V-90 of 5.2 Vrms., and 6.3 Vrms., respectively.

EXAMPLE 11

5 wt. % of p-n-hexylcyanobenzene were added to 95 wt. % of composition-1 and the whole was stirred to obtain Np-liquid crystal composition. The Np-liquid crystal composition had a mesomorphic range of from −18°C to 58°C. TN-type device using thus obtained Np-liquid crystal composition had V-10 and V-90 of 4.2 Vrms., and 5.3 Vrms., respectively.

EXAMPLE 12

7 wt. % of p-n-hexylcyanobenzene were added to 93 wt. % of composition-1 and the whole was stirred to obtain Np-liquid crystal composition. The Np-liquid crystal composition had a mesomorphic range of from −20°C to 50°C. TN-type device using this obtained N-liquid crystal composition had V-10 and V-90 of 3.1 Vrms., and 4.6 Vrms, respectively.

EXAMPLE 13

3 wt. % of p-n-heptylcyanobenzene were added to 97 wt. % of composition-1 and the whole was stirred to obtain Np-liquid crystal composition. The Np-liquid crystal composition had a mesomorphic range of from −20°C to 61°C. TN-type device using thus obtained Np-liquid crystal composition had V-10 and V-90 of 7.2 Vrms., and 9.6 Vrms., respectively.

EXAMPLE 14

5 wt. % of p-n-heptylcyanobenzene were added to 95 wt. % of composition-1 and the whole was stirred to obtain Np-liquid crystal composition. The Np-liquid crystal composition had a mesomorphic range of from −20°C to 57°C. TN-type device using thus obtained Np-liquid crystal composition had V-10 and V-90 of 5.0 Vrms., and 6.1 Vrms., respectively.

EXAMPLE 15

7 wt. % of p-n-heptylcyanobenzene were added to 93 wt. % of composition-1 and the whole was stirred to obtain Np-liquid crystal composition. The Np-liquid crystal composition had a mesomorphic range of from −20°C to 53°C. TN-type device using thus obtained N-liquid crystal composition had V-10 and V-90 of 3.8 Vrms., and 4.8 Vrms, respectively.

EXAMPLE 16

3 wt. % of p-n-octylcyanobenzene were added to 97 wt. % of composition-1 and the whole was stirred to obtain Np-liquid crystal composition. The Np-liquid crystal composition had a mesomorphic range of from −20°C to 62°C. TN-type device using thus obtained Np-liquid crystal composition had V-10 and V-90 of 7.4 Vrms., and 11.2 Vrms., respectively.

EXAMPLE 17

5 wt. % of p-n-octylcyanobenzene were added to 95 wt. % of composition-1 and the whole was stirred to obtain Np-liquid crystal composition. The Np-liquid crystal composition had a mesomorphic range of from −20°C to 57°C. TN-type device using thus obtained Np-liquid crystal composition had V-10 and V-90 of 4.6 Vrms., and 7.4 Vrms., respectively.

EXAMPLE 18

7 wt. % of p-n-octylcyanobenzene were added to 93 wt. % of composition-1 and the whole was stirred to obtain Np-liquid crystal composition. The Np-liquid crystal composition had a mesomorphic range of from −20°C to 54°C. TN-type device using thus obtained N-liquid crystal composition had V-10 and V-90 of 4.0 Vrms., and 5.3 Vrms., respectively.

EXAMPLE 19

2.5 wt. % of p-n-propylcyanobenzene and 2.5 wt. % of p-n-butylcyanobenzene were added to 95 wt. % of composition-1 and the whole was stirred to obtain Np-liquid crystal composition. The Np-liquid crystal composition had a mesomorphic range of from −20°C to 56°C. TN-type device using thus obtained Np-liquid crystal composition had V-10 and V-90 of 4.3 Vrms., and 6.2 Vrms., respectively.

EXAMPLE 20

2.5 wt. % of p-n-pentylcyanobenzene and 2.5 wt. % of p-n-hexylcyanobenzene were added to 95 wt. % of composition-1 and the whole was stirred to obtain Np-liquid crystal composition. The Np-liquid crystal composition had a mesomorphic range of from −20°C to 56°C. TN-type device using thus obtained Np-liquid crystal composition had V-10 and V-90 of 4.8 Vrms., and 6.1 Vrms., respectively.

EXAMPLE 21

2.5 wt. % of p-n-heptylcyanobenzene and 2.5 wt. % of p-n-octylcyanobenzene were added to 95 wt. % of composition-1 and the whole was stirred to obtain Np-liquid crystal composition. The Np-liquid crystal composition had a mesomorphic range of from −20°C to 57°C. TN-type device using thus obtained N-liquid crystal composition had V-10 and V-90 of 4.5 Vrms., and 7.2 Vrms., respectively.

EXAMPLE 22

2 wt. % of p-cyanobenzylidene aniline and 3 wt. % of p-n-octyloxybenzoic acid p′-cyanophenyl ester were added to 95 wt. % of composition-1 and mixed together. The Np-liquid crystal composition thus obtained had a mesomorphic range of <−18° ~ 66°C. TN-type device using the Np-liquid crystal composition had V-10 and V-90 of 3.75 Vrms., and 5.0 Vrms., respectively.

EXAMPLE 23

5 wt. % of p-cyanobenzylidene aniline and 5 wt. % of p-cyanophenyl p′-n-octyloxybenzoate were added to 90 wt. % of composition-1 and mixed together. The Np-liquid crystal composition thus obtained had a mesomorphic range of <−18° ~ 63°. TN-type device using the Np-liquid crystal composition had V-10 and V-90 of 2.65 Vrms., and 3.4 Vrms., respectively.

EXAMPLE 24

7 wt. % of p-cyanobenzylidene aniline and 8 wt. % of p-n-octyloxybenzoic acid p′-cyanophenyl ester were added to 85 wt. % of composition-1 and mixed together. The Np-liquid crystal composition thus obtained had a mesomorphic range of <−18°~ 59°C. TN-type device using the Np-liquid crystal composition had V-10 and V-90 of 2.1 Vrms., and 3.35 Vrms., respectively.

EXAMPLE 25

10 wt. % of p-cyanobenzylidene aniline and 10 wt. % of p-cyanophenyl p′-octyloxybenzoate were added to 80 wt. % of composition-1 and mixed together. The Np-liquid crystal composition thus obtained had a mesomorphic range of −10° ~ 56°C. TN-type device using the Np-liquid crystal composition had V-10 and V-90 of 2.0 Vrms., and 2.8 Vrms., respectively.

EXAMPLE 26

14 wt. % of p-cyanobenzylidene aniline and 6 wt. % of p-cyanophenyl p′-n-octyloxybenzoate were added to 80 wt. % of composition-1 and mixed together. The Np-liquid crystal composition thus obtained had a mesomorphic range of −12° ~ 49°C. TN-type device using the Np-liquid crystal composition had V-10 and V-90 of 1.8 Vrms., and 2.35 Vrms., respectively.

EXAMPLE 27

6 wt. % of p-cyanobenzylidene aniline and 14 wt. % of p-cyanophenyl p-n-octyloxybenzoate were added to 80 wt. % of composition-1 and mixed together. The Np-liquid crystal composition thus obtained had a mesomorphic range of −5° ~ 62°C. TN-type device using the Np-liquid crystal composition had V-10 and V-90 of 2.0 Vrms., and 3.0 Vrms., respectively.

EXAMPLE 28

9 wt. % of p-cyanobenzylidene aniline and 11 wt. % of p-cyanophenyl p′-n-octyloxybenzoate were added to 80 wt. % of composition-1 and mixed together. The thus obtained Np-liquid crystal composition (composition-2) had a mesomorphic range of −8° ~ 58°C and V-10 of 1.8 Vrms., V-90 of 3.4 Vrms., and V-90/V-10 of 1.90. Further, 3 wt. % of p-n-propylcyanobenzene were added to 97 wt. % of the composition-2 and mixed together. The thus obtained Np-liquid crystal composition had a mesomorphic range of −20° ~ 55°C. TN-type device using the Np-liquid crystal composition had V-10 of 1.7 Vrms., V-90 of 2.5 Vrms., and V-90/V-10 of 1.47.

EXAMPLE 29

5 wt. % of p-n-propylcyanobenzene were added to 95 wt. % of composition-2 and mixed together. The Np-liquid crystal composition thus obtained had a mesomorphic range of −20° ~ 57°C. TN-type device using the Np-liquid crystal composition had V-10, V-90 and V-90/V-10 of 1.5 Vrms., 2.1 Vrms., and 1.40, respectively.

EXAMPLE 30

7 wt. % of p-n-propylcyanobenzene were added to 93 wt. % of composition-2 and mixed together. The Np-liquid crystal composition thus obtained had a mesomorphic range of −20° ∼ 53°C. TN-type device using the Np-liquid crystal composition had V-10, V-90 and V-90/V-10 of 1.6 Vrms., 2.3 Vrms., and 1.43, respectively.

EXAMPLE 31

3 wt. % of p-n-butylcyanobenzene were added to 97 wt. % of composition-2 and mixed together. The Np-liquid crystal composition thus obtained had a mesomorphic range of −10° ∼ 55°C. TN-type device using the Np-liquid crystal composition had V-10, V-90 and V-90/V-10 of 1.75 Vrms., 2.5 Vrms., and 1.43, respectively.

EXAMPLE 32

5 wt. % of p-n-butylcyanobenzene were added to 95 wt. % of composition-2 and mixed together. The Np-liquid crystal composition thus obtained had a mesomorphic range of −15° ∼ 50°C. TN-type device using the Np-liquid crystal composition had V-10, V-90 and V-90/V-10 of 1.5 Vrms., 2.2 Vrms., and 1.47, respectively.

EXAMPLE 33

7 wt. % of p-n-butylcyanobenzene were added to 93 wt. % of composition-2 and mixed together. The Np-liquid crystal composition thus obtained had a mesomorphic range of −18° ∼ 45°C. TN-type device using the Np-liquid crystal composition had V-10, V-90 and V-90/V-10 of 1.3 Vrms., 1.9 Vrms., and 1.46, respectively.

EXAMPLE 34

3 wt. % of p-n-pentylcyanobenzene were added to 97 wt. % of composition-2 and mixed together. The Np-liquid crystal composition thus obtained had a mesomorphic range of −10° ∼ 52°C. TN-type device using the Np-liquid crystal composition had V-10, V-90 and V-90/V-10 of 1.85 Vrms., 2.25 Vrms., and 1.22, respectively.

EXAMPLE 35

5 wt. % of p-n-pentylcyanobenzene were added to 95 wt. % of composition-2 and mixed together. The Np-liquid crystal composition thus obtained had a mesomorphic range of −10° ∼ 48°C. TN-type device using the Np-liquid crystal composition had V-10, V-90 and V-90/V-10 of 1.65 Vrms., 2.5 Vrms., and 1.52, respectively.

EXAMPLE 36

7 wt. % of p-n-pentylcyanobenzene were added to 93 wt. % of composition-2 and mixed together. The Np-liquid crystal composition thus obtained had a mesomorphic range of −20° ∼ 44°C. TN-type device using the Np-liquid crystal composition had V-10, V-90 and V-90/V-10 of 1.4 Vrms., 2.1 Vrms., and 1.50, respectively.

EXAMPLE 37

3 wt. % of p-n-hexylcyanobenzene were added to 97 wt. % of composition-2 and mixed together. The Np-liquid crystal composition thus obtained had a mesomorphic range of −15° ∼ 52°C. TN-type device using the Np-liquid crystal composition had V-10, V-90 and V-90/V-10 of 1.7 Vrms., 2.4 Vrms., and 1.41, respectively.

EXAMPLE 38

5 wt. % of p-n-hexylcyanobenzene were added to 95 wt. % of composition-2 and mixed together. The Np-liquid crystal composition thus obtained had a mesomorphic range of −20° ∼ 45°C. TN-type device using the Np-liquid crystal composition had V-10, V-90 and V-90/V-10 of 1.5 Vrms., 2.1 Vrms., and 1.40, respectively.

EXAMPLE 39

7 wt. % of p-n-hexylcyanobenzene were added to 93 wt. % of composition-2 and mixed together. The Np-liquid crystal composition thus obtained had a mesomorphic range of −20° ∼ 38°C. TN-type device using the Np-liquid crystal composition had V-10, V-90 and V-90/V-10 of 1.2 Vrms., 1.56 Vrms., and 1.30, respectively.

EXAMPLE 40

3 wt. % of p-n-heptylcyanobenzene were added to 97 wt. % of composition-2 and mixed together. The Np-liquid crystal composition thus obtained had a mesomorphic range of −10° ∼ 55°C. TN-type device using the Np-liquid crystal composition had V-10, V-90 and V-90/V-10 of 1.7 Vrms., 2.6 Vrms., and 1.53, respectively.

EXAMPLE 41

5 wt. % of p-n-heptylcyanobenzene were added to 95 wt. % of composition-2 and mixed together. The Np-liquid crystal composition thus obtained had a mesomorphic range of −15° ∼ 50°C. TN-type device using the Np-liquid crystal composition had V-10, V-90 and V-90/V-10 of 1.7 Vrms., 2.8 Vrms., and 1.65, respectively.

EXAMPLE 42

7 wt. % of p-n-heptylcyanobenzene were added to 93 wt. % of composition-2 and mixed together. The Np-liquid crystal composition thus obtained had a mesomorphic range of −15° ∼ 44°C. TN-type device using the Np-liquid crystal composition had V-10, V-90 and V-90/V-10 of 1.6 Vrms., 2.3 Vrms., and 1.44, respectively.

EXAMPLE 43

3 wt. % of p-n-octylcyanobenzene were added to 97 wt. % of composition-2 and mixed together. The Np-liquid crystal composition thus obtained had a mesomorphic range of −10° ∼ 53°C. TN-type device using the Np-liquid crystal composition had V-10, V-90 and V-90/V-10 of 1.8 Vrms., 2.6 Vrms., and 1.44, respectively.

EXAMPLE 44

5 wt. % of p-n-octylcyanobenzene were added to 95 wt. % of composition-2 and mixed together. The Np-liquid crystal composition thus obtained had a mesomorphic range of −15° ∼ 49°C. TN-type device using the Np-liquid crystal composition had V-10, V-90 and V-90/V-10 of 1.85 Vrms., 2.4 Vrms., and 1.30, respectively.

EXAMPLE 45

7 wt. % of p-n-octylcyanobenzene were added to 93 wt. % of composition-2 and mixed together. The Np-liquid crystal composition thus obtained had a mesomorphic range of −15° ∼ 43°C. TN-type device using the Np-liquid crystal composition had V-10, V-90 and V-90/V-10 of 1.6 Vrms., 2.4 Vrms., and 1.50, respectively.

EXAMPLE 46

2.5 wt. % of p-n-propylcyanobenzene and 2.5 wt. % of p-n-butylcyanobenzene were added to 95 wt. % of composition-2 and mixed together. The thus obtained Np-liquid crystal composition had a mesomorphic range of −15° ∼ 53°C. TN-type device using the Np-liquid crystal composition had V-10 of 1.5 Vrms., V-90 of 2.2 Vrms., and V-90/V-10 of 1.47.

EXAMPLE 47

2.5 wt. % of p-n-pentylcyanobenzene and 2.5 wt. % of p-n-hexylcyanobenzene were added to 95 wt. % of composition-2 and mixed together. The thus obtained Np-liquid crystal composition had a mesomorphic range of −14° ∼ 51°C. TN-type device using the Np-liquid crystal composition had V-10 of 1.6 Vrms., V-90 of 2.3 Vrms., and V-90/V-10 of 1.44.

EXAMPLE 48

2.5 wt. % of p-n-heptylcyanobenzene and 2.5 wt. % of p-n-octylcyanobenzene were added to 95 wt. % of composition-2 and mixed together. The thus obtained Np-liquid crystal composition had a mesomorphic range of −15° ∼ 51°C. TN-type device using the Np-liquid crystal composition had V10 of 1.75 Vrms., V-90 of 2.5 Vrms., and V-90/V-10 of 1.43.

What we claim is:

1. A nematic liquid crystal composition having positive dielectric anisotropy consisting of a mixture of a nematic liquid crystal composition having negative dielectric anisotropy consisting of p-methoxybenzylidene-p′-n-butylaniline (MBBA), p-ethoxybenzylidene-p′-n-butylaniline (EBBA), p-methoxybenzylidene-p′-n-heptylaniline (MBHpA) and p-ethoxybenzylidene-p′-n-heptylaniline (EBHpA), each being represented by the formulae,

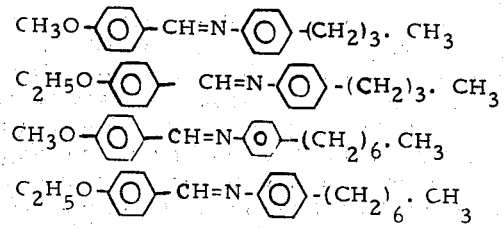

and positive dielectric anisotropy-imparting agent selected from at least one p-n-alkylcyanobenzene having the formula,

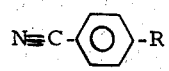   I wherein R is a n-propyl, n-butyl, n-pentyl, n-hexyl, n-heptyl or n-octyl group, a weight ratio of said nematic liquid crystal composition having negative dielectric anisotropy to said positive dielectric anisotropy-imparting agent being within the range of 97.3 to 93.7.

2. A nematic liquid crystal composition having positive dielectric anisotropy of claim 1 wherein said liquid crystal composition having negative dielectric anisotropy consists of MBBA at more than about 5% by weight, EBBA at less than about 57% by weight, EBHpA at less than about 23% by weight and MBHpA at less than about 15% by weight.

3. A nematic liquid crystal composition having positive dielectric anisotropy of claim 1 wherein said liquid crystal composition having negative dielectric anisotropy consists of 9 to 31% by weight of the MBBA, 50 to 56% by weight of the EBBA, 14 to 21% by weight of the EBHpA and 5 to 14% by weight of the MBHpA.

4. A nematic liquid crystal composition having positive dielectric anisotropy of claim 1 wherein said liquid crystal composition having negative dielectric anisotropy consists of 13 to 22% by weight of the MBBA, 52 to 54% by weight of the EBBA, 17 to 20% by weight of the EBHpA and 9 to 13% by weight of the MBHpA.

5. A nematic liquid crystal composition having positive dielectric anisotropy of claim 1 wherein said liquid crystal composition having negative dielectric anisotropy consists of 19% by weight of MBBA, 53% by weight of the EBBA, 18% by weight of the EBHpA and 10% by weight of the MBHpA.

6. A liquid crystal electro-optical device containing a nematic liquid crystal composition having positive dielectric anisotropy which comprises a pair of electrode plates and a thin layer of the nematic liquid crystal composition of claim 1 supported between said two plates, the electrode surfaces being treated previously so that they have a predetermined orientation, said electrode plates being combined together in such a manner that the orientations caused by the treatment of the electrode surfaces are substantially perpendicular to each other.

7. A light modulation apparatus comprising a pair of polarizers and the nematic liquid crystal electro-optical device of claim 6 arranged between said two polarizers.

8. A nematic liquid crystal composition having positive dielectric anisotropy consisting of a mixture of a nematic liquid crystal composition having negative dielectric anisotropy consisting of p-methoxybenzylidene-p′-n-butylaniline (MBBA), p-ethoxybenzylidene-p′-n-butylaniline (EBBA), p-methoxybenzylidene-p′-n-heptylaniline (MBHpA) and p-ethoxybenzylidene-p′-n-heptylaniline (EBHpA), each being represented by the formulae,

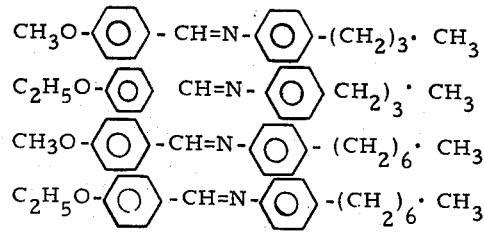

and positive dielectric anisotropy-imparting agent consisting of a mixture of p-cyanobenzylideneaniline having the formula,

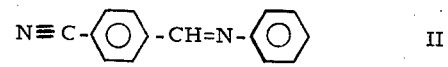   II and p-cyanophenyl p′-n-octyloxybenzoate having the fomula,

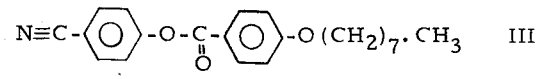   III in the weight ratio of II to III of from 7:3 to 3:7, a weight ratio of said nematic liquid crystal composition having negative dielectric anisotropy to said positive dielectric anisotropy-imparting agent being within the range of 3:1 to 19:1.

9. A nematic liquid crystal composition having positive dielectric anisotropy of claim 8 wherein said liquid crystal composition having negative dielectric anisotropy consists of MBBA at more than about 5% by weight, EBBA at less than about 57% by weight, EBHpA at less than about 23 % by weight and MBHpA at less than about 15% by weight.

10. A nematic liquid crystal composition having positive dielectric anisotropy of claim 8 wherein said liquid crystal composition having negative dielectric anisotropy consists of 9 to 31% by weight of the MBBA, 50 to 56 % by weight of the EBBA, 14 to 21% by weight of the EBHpA and 5 to 14% by weight of the MBHpA.

11. A nematic liquid crystal composition having positive dielectric anisotropy of claim 8 wherein said liquid crystal composition having negative dielectric anisotropy consists of 13 to 22% by weight of the MBBA, 52 to 54 % by weight of the EBBA, 17 to 20% by weight of the EBHpA and 9 to 13% of the MBHpA.

12. A nematic liquid crystal composition having positive dielectric anisotropy of claim 8 wherein said liquid crystal composition having negative dielectric anisotropy consists of 19% by weight of the MBBA, 53% by weight of the EBBA, 18% by weight of the EBHpA and 10% by weight of the MBHpA.

13. A liquid crystal electro-optical device containing a nematic liquid crystal composition having positive dielectric anisotropy which comprises a pair of electrode plates and a thin layer of the nematic liquid crystal composition of claim 8 supported between said two plates, the electrode surfaces being treated previously so that they have a predetermined orientation, said electrode plates being combined together in such a manner that the orientations caused by the treatment of the electrode surfaces are substantially perpendicular to each other.

14. A light modulation apparatus comprising a pair of polarizers and the nematic liquid crystal electro-optical device of claim 13 arranged between said two polarizers.

15. A nematic liquid crystal composition having positive dielectric anisotropy consisting of a mixture of (A) a nematic liquid crystal composition having negative dielectric anisotropy consisting of p-methoxybenzylidene-p'-n-butylaniline (MBBA), p-ethoxybenzylidene-p'-n-butylaniline (EBBA), p-methoxybenzylidene-p'-n-heptylaniline (MBHpA) and p-ethoxybenzylidene-p'-n-heptylaniline (EBHpA), each being represented by the formulae,

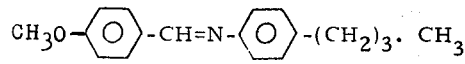

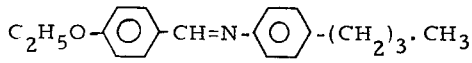

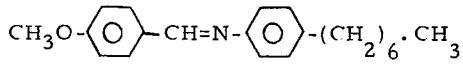

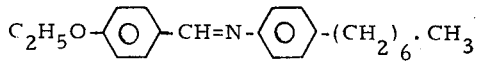

and positive dielectric anisotropy-imparting agent consisting of a mixture of (B) p-cyanobenzylideneaniline of the formula II,

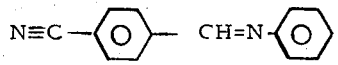

(C) p-cyanophenyl p'-n-octyloxybenzoate of the formula III,

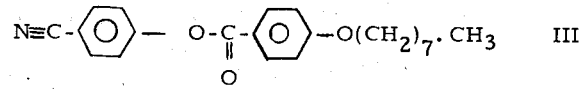

and (D) at least one p-n-alkylcyanobenzene of the formula I,

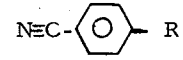

wherein R is a n-propyl, n-butyl, n-pentyl, n-hexyl, n-heptyl or n-octyl group, a weight ratio of (A) liquid crystal composition having negative dielectric anisotropy to (B) + (C) being within the range of 3:1 to 19:1, a weight ratio of (B) to (C) being within of 7:3 to 3:7, and a weight ratio of (A) + (B) + (C) to (D) being within the range of 93:7 to 97:3.

16. A nematic liquid crystal composition having positive dielectric anisotropy of claim 15 wherein said liquid crystal composition having negative dielectric anisotropy consists of MBBA at more than about 5% by weight, EBBA at less than about 57% by weight, EBHpA at less than about 23% by weight and MBHpA at less than about 15% by weight.

17. A nematic liquid crystal composition having positive dielectric anisotropy of claim 15 wherein said liquid crystal composition having negative dielectric anisotropy consists of 9 to 31% by weight of MBBA, 50 to 56% by weight of the EBBA, 14 to 21% by weight of the EBHpA and 5 to 14 % by weight of the MBHpA.

18. A nematic liquid crystal composition having dielectric anisotropy of claim 15 wherein said liquid crystal composition having negative dielectric anisotropy consists of 13 to 22% by weight of the MBBA, 52 to 54% by weight of the EBBA, 17 to 20% by weight of the EBHpA and 9 to 13% by weight of the MBHpA.

19. A nematic liquid crystal composition having positive dielectric anisotropy of claim 15 wherein said liquid crystal composition having negative dielectric anisotropy consists of 19% by weight of the MBBA, 53% by weight of the EBBA, 18% by weight of the EBHpA and 10 % by weight of the MBHpA.

20. A liquid crystal electro-optical device containing a nematic liquid crystal composition having positive dielectric anisotropy which comprises a pair of electrode plates and a thin layer of the nematic liquid crystal composition of claim 15 supported between said two plates, the electrode surfaces being treated previously so that they have a predetermined orientation, said electrode plates being combined together in such a manner that the orientations caused by the treatment of the electrode surfaces are substantially perpendicular to each other.

21. A light modulation apparatus comprising a pair of polarizers and the nematic liquid crystal electro-optical device of claim 20 arranged between said two polarizers.

* * * * *

UNITED STATES PATENT AND TRADEMARK OFFICE
CERTIFICATE OF CORRECTION

PATENT NO. : 3,977,768
DATED : August 31, 1976
INVENTOR(S) : Kenji Nakamura, Mashachika Yaguchi, Toshio Jinnai It is certified that error appears in the above-identified patent and that said Letters Patent are hereby corrected as shown below:

IN THE HEADING

Assignee: "Dai Nippon Toryo Kaubshiki Kaisha" should read:

--Dai Nippon Toryo Kabushiki Kaisha--

Signed and Sealed this

Twenty-ninth Day of March 1977

[SEAL]

Attest:

RUTH C. MASON
Attesting Officer

C. MARSHALL DANN
Commissioner of Patents and Trademarks